United States Patent [19]

Cummings

[11] 4,436,262
[45] Mar. 13, 1984

[54] WINDBLAST HEAD PROTECTOR FOR USE DURING PILOT EJECTION FROM AN AIRCRAFT

[75] Inventor: Robert J. Cummings, Hermosa Beach, Calif.

[73] Assignee: The United States of America as represented by the Secretary of the Air Force, Washington, D.C.

[21] Appl. No.: 370,693

[22] Filed: Apr. 22, 1982

[51] Int. Cl.³ .............................................. B64D 25/04
[52] U.S. Cl. ................................................ 244/122 AG
[58] Field of Search ................ 244/122, 141; 280/801, 280/808, 748; 297/464–468, 474, 475; 269/328; 128/133, 134; 2/410, 411

[56] References Cited

U.S. PATENT DOCUMENTS

| | | | |
|---|---|---|---|
| 2,965,335 | 12/1960 | Bohlin | 244/122 |
| 3,158,344 | 11/1964 | Koochembere | 244/122 |
| 3,645,259 | 2/1972 | Schulman | 128/133 |

FOREIGN PATENT DOCUMENTS

| | | | |
|---|---|---|---|
| 530391 | 9/1956 | Canada | 244/122 B |
| 940510 | 2/1956 | Fed. Rep. of Germany | 244/122 B |
| 1008477 | 10/1965 | United Kingdom | 244/122 B |
| 1369860 | 10/1974 | United Kingdom | 244/122 A |

*Primary Examiner*—Galen L. Barefoot
*Assistant Examiner*—Rodney Corl
*Attorney, Agent, or Firm*—Donald J. Singer; Jacob N. Erlich

[57] ABSTRACT

A windblast head protector for use in conjunction with an ejection seat of a high performance aircraft in order to protect the head of a crew member during ejection from the aircraft. The protector includes a deployable U-shaped tubular frame which supports a canopy that extends over the top of a crew member's helmet. The frame is held in place when fully deployed by two cords which extend from the frame's forward edge to two rings attached to the headrest of the ejection seat. The head protector is normally stowed in the pilot chute compartment on top of the main parachute pack of the ejection seat and moved into the fully deployed position by means of cable passing through the frame and operably connected to a deployment mechanism.

9 Claims, 5 Drawing Figures

WINDBLAST HEAD PROTECTOR FOR USE DURING PILOT EJECTION FROM AN AIRCRAFT

STATEMENT OF GOVERNMENT INTEREST

The invention described herein may be manufactured and used by or for the Government for governmental purposes without the payment of any royalty thereon.

BACKGROUND OF THE INVENTION

This invention relates generally to pilot ejection systems for aircraft, and, more particuarly, to a windblast head protector for use during pilot ejection from the aircraft.

Crew safety is considered to be of utmost importance when designing todays high performance aircraft. This is of special consideration during times of aircraft malfunction which results in the necessity of the pilot "bailing-out" of the aircraft. Consequently, many advances have been made in pilot ejection methods and systems.

The ACES-II ejection seat manufactured by McDonnell Douglas Corporation is currently utilized in a majority of high performance aircraft such as the F-16, F-15 and A-10. Unfortunately, high speed ejection can cause a variety of injuries to the ejecting crew member. Head and/or neck injury to a crew member can occur as a result of conditions set forth hereinbelow which arise while the crew member ejects from the aircraft in an open ejection seat at high dynamic pressures.

First, aerodynamic flow over the top of the standard helmet causes a large pressure drop to occur so that the normal pressure inside the helmet acts to push the helmet away from the head with 400 or more pounds force. If the helmet is retained on the head of a crew member, these loads must then be born by the chin strap and jaw. If the helmet is lost, the soft tissues of the face are likely to be damaged by the windblast or head injury may occur at ground landing.

Second, during the first few hundred milliseconds after ejection, before the decelerator/stabilizer drogue parachute inflates, the mass of the seat combined with that of the crewman's torso cause them to have a lower drag/mass than the head. This situation can cause a flailing of the head to take place in the windblast. In the absence of aerodynamic unstability in the seat and/or helmet and O$_2$ mask assembly, the headrest would normally support the head/helmet against net windblast loads. However, both the ejection seat and the helmet/mask are aerodynamically unstable so that the headrest is ineffective in providing the needed support to the head and neck. A larger headrest could be provided but this would greatly reduce the pilot's external vision and, thereby, reduce the overall effectiveness of the aircraft. The helmet could be restrained to the headrest by a retractable cord but the large relative displacement between seat and crewman at drogue inflation would result in dangerous loads in the neck.

Third, a combination of roll instability and pitch moments due to the main chute motor and drogue release delay cause a tendency of the seat to turn its side to the inflating main parachute. The pitch-up roll maneuver leading to this has a high probability of causing the distol parachute rise and therefore move between the headrest and helmet so that opening shock loads may be directly born by the neck. The restraint release delay could be increased but this would only partially reduce the shear loading of the neck while reducing the safety margin on the main chute load capacity.

As is readily apparent from the above-identified problems encountered by crewman during ejection and the unsucessful attempts to solve these problems, it becomes essential to provide additional safety equipment on existing ejection seat equipment. This safety equipment must not only be capable of increasing crew member safety, but it must also prevent any decrease in aircraft performance during periods of nonuse.

SUMMARY OF THE INVENTION

The present invention overcomes the problems encountered in the past and as set forth in detail hereinabove by providing a windblast head protector which can be normally stowed in the pilot chute compartment on top of the main parachute pack of a conventional ejection seat. Upon deployment, the windblast head protector is capable of substantially reducing injury to the ejecting crew member.

The windblast head protector of this invention is in the form of a canopy which deploys over the top of the crewman's helmet. The canopy is supported by a U-shaped tubular frame which stores within the pilot chute during its inoperative condition. Once activated, the canopy and frame are held in place by two cords which run from the forward edge of the frame to two rings which are attached to the lower front of the headrest of the conventional ejection seat and to the shoulder harness release pin. The two cords when deployed lie on either side of the helmet running from the upper front to the lower rear.

During use the canopy traps air above the helmet. Air flow over the top of the canopy creates low pressure so that the higher pressure air between the canopy and the helmet pushes up on the canopy with several hundred pounds of force. This load is transferred to the headrest at the back of the canopy and to the tubular frame at the front of the canopy. The legs of the tubular frame carry compression loads to the top of the headrest while the two cords carry tension loads to the bottom of the headrest. The tension loads in the cords maintain them in position at the side of the helmet against the action of drag forces on the cords.

The tubular frame is held in position against the headrest by a loop of cable which is routed inside the tubular frame and through a hole on either side of the headrest. The holes on the headrest are also fitted with projecting inserts which absorb shear loads from the frame. The same cable which is used to hold the frame in place is also used to deploy the frame, canopy and frame support cords.

The windblast head protector of this invention treats all three of the injury conditions described above without restricting external vision and at a low weight penalty. The deployed canopy cancels lift forces on the helmet by blocking the flow of air over its upper surface. The cords at the sides of the helmet absorb side forces on the helmet without generating torsion forces on it. The tubular frame prevents the parachute risers from slipping between the helmet and the headrest.

It is therefore an object of this invention to provide a windblast head protector which eliminates the injury conditions encountered during crew member ejection from an aircraft.

It is another object of this invention to provide a windblast head protector which utilizes therein a canopy in order to eliminate lift on the helmet of a crew member during ejection.

It is a further object of this invention to provide a windblast head protector which incorporates therein a tubular frame and side cords in order to absorb lateral loads on the helmet of a crew member without torsion and with freedom to respond to drogue shock induced movements between the ejection seat and the crew member.

It is still another object of this invention to provide a windblast head protector which utilizes a shear absorbing tubular frame to prevent the parachute risers from slipping between the helmet and headrest during ejection.

It is still a further object of this invention to provide a windblast head protector which utilizes the pilot chute compartment for stowage of the canopy and frame of the protector.

It is still another object of this invention to provide a windblast head protector which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

Figure 4:
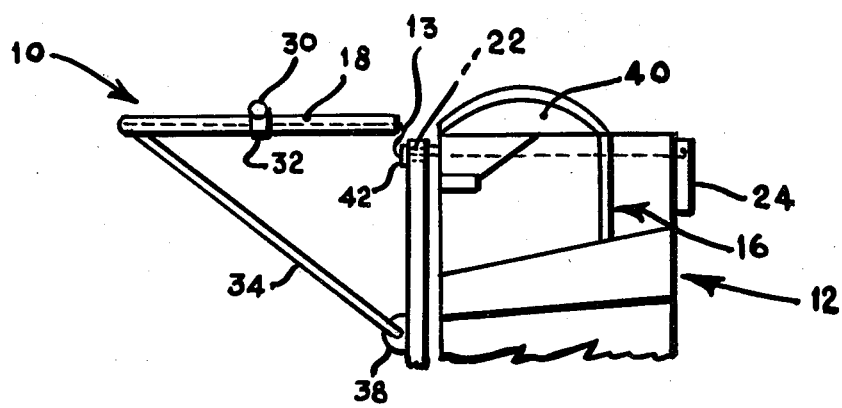
Figure 5:
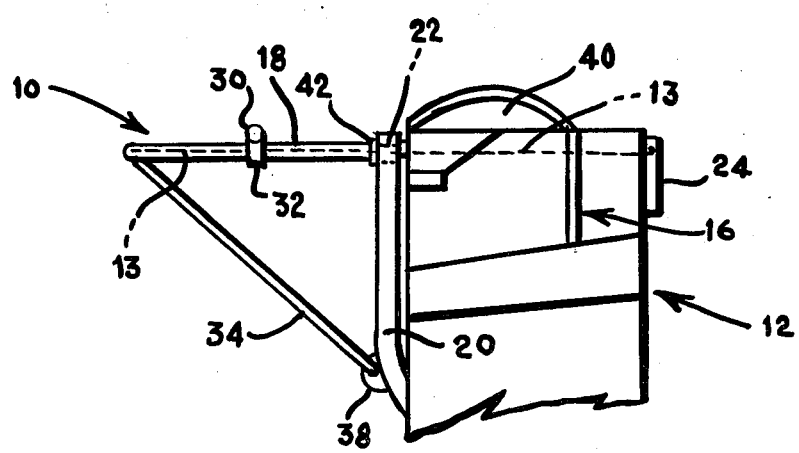

FIG. 4 of the drawing is a side elevational view, shown partly in schematic fashion, of the windblast head protector of this invention illustrating in exaggerated fashion its propulsion from its stowed position to its deployed position; and FIG. 5 is a side elevational view, shown partly in schematic fashion, of the windblast head protector of this invention in its fully deployed condition.

DETAILED DESCRIPTION OF THE PREFERRED EMBODIMENT

Figure 1:
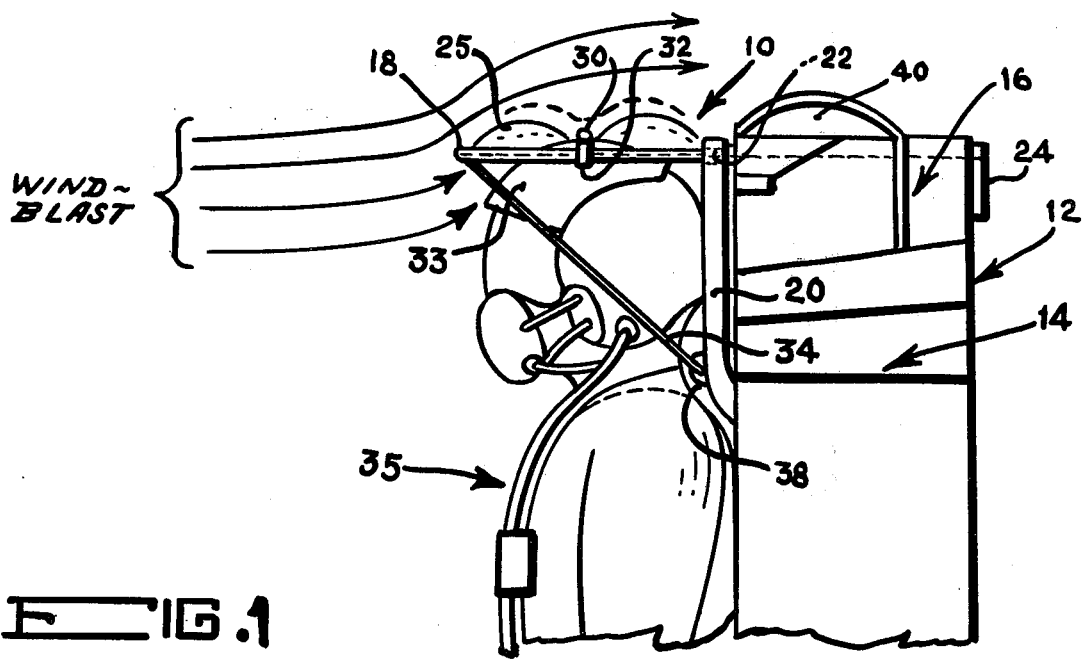
FIG. 1 is a side elevational view, shown partially in schematic fashion, of the windblast head protector of this invention in the deployed condition and resting upon the helmet of a crew member.
Figure 2:
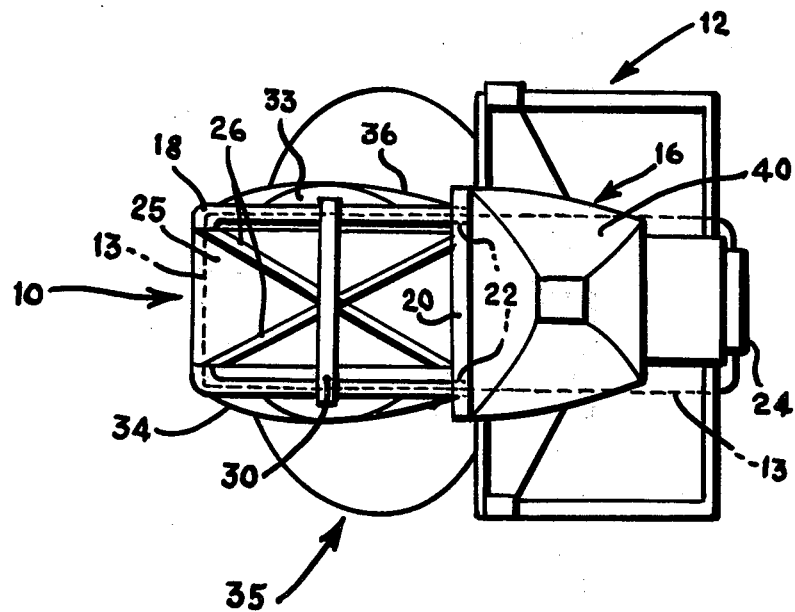
FIG. 2 is a plan view, shown partly in schematic fashion of the windblast head protector of this invention in its deployed condition.

Reference is now made to FIGS. 1 and 2 of the drawing which clearly illustrate the windblast head protector 10 of this invention. Windblast head protector 10, as shown in the Figures is utilized in conjunction with a conventional ejection seat 12 (a portion of which is shown) which stores therein a main parachute pack 14 and a pilot chute compartment 16. Although the windblast head protector 10 of this invention is intended for use on the ACES-II ejection seat 12 manufactured by McDonnell Douglas Corporation, it is designed so that it may also be utilized with other types of ejection seats.

Protector 10 is made of a tubular U-shaped frame 18 which is held in position against the front of headrest 20 of ejection seat 12 by a cable 13 which is routed through the inside of tubular frame 18 and extends through a pair of openings 22 in headrest 20 while passing through the ejection seat to a conventional pyrotechnic or ballistically actuated deployment mechanism 24 in order to deploy head protector 10 in a manner set forth in detail hereinbelow.

A fabric canopy 25 is secured between the front of the U-shaped frame 18 and the headrest 20 with a pair of cross bands 26 adding stability thereto. Crossed bands 26 are each secured at one thereof to the front of tubular frame 18 and at the rear to the headrest 20. A cross bar 30 is positioned across the two side legs of frame 18 on a slidable mount 32 so as to prevent the front of the frame from contacting the helmet 33 of a crew member 35 in the manner shown in FIG. 1 of the drawing.

Frame 18 is held in place in its deployed state by two cords 34 and 36 which run from the forward edge of frame 18 to two rings 38 attached to each side of the lower front of headrest 20. Rings 38 are in turn connected to the shoulder harness release pin (not shown). The two cords 34 and 36 as shown in FIGS. 1 and 2 of the drawing lie on either side of the helmet 33 of a crew member 35 running from the upper front to the lower rear. As a result three point contact between helmet 33 and head protector 10 provides for lateral support without twisting helmet 33. This three point contact is defined by the contact between frame 18 and helmet 33, between the side cords 34 and 36 and helmet 33, and between headrest 20 and the back of helmet 33.

Figure 3:
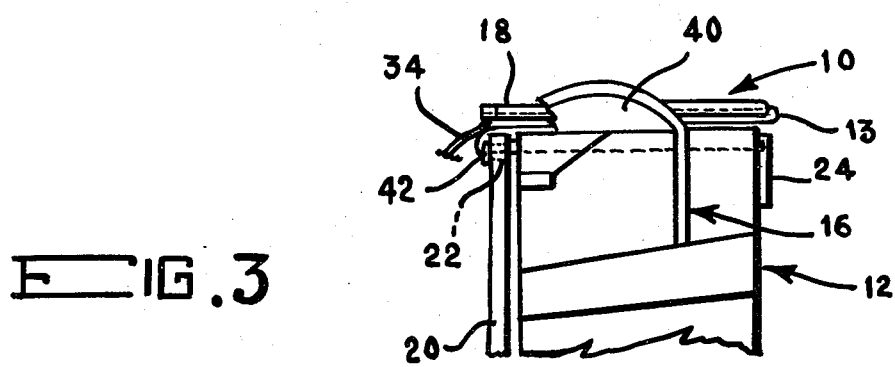
FIG. 3 is a side elevational view, shown partly in schematic fashion, of the windblast head protector of this invention in its stowed, inoperative condition.

Reference is now made to FIG. 3 of the drawing which depicts head protector 10 in its inoperable position. In this position windblast head protector 10 is capable during nonuse of being stowed into existing seat equipment, that is positioned within the pilot chute cover or compartment 40 as indicated in the drawing. In this position windblast head protector 10 obscures the least amount of existing external view for crew member 35. In its position within chute compartment 40 cable 13 which extends through the tubular frame 18 of head protector 10 of this invention has sufficient slack to allow the two side legs of frame 18 to be inserted inside the side flaps on the parachute chute compartment 40. As stated hereinabove the ends of the cable 13 are operably connected to a conventional pyrotechnic or ballistically actuated deployment mechanism 24 so that upon actuation thereof a force is applied to the chord thereby pulling frame 18 out of the side flaps on the pilot's chute compartment 40 (as indicated in exaggerated fashion in FIG. 4 of the drawing) and then drawing frame 18 back against inserts 42 which are located on headrest 20. In this manner the stowed windblast head protector 10 of this invention can be released into a useable position as shown in FIGS. 1, 2 and 5 of the drawing.

Once head protector 10 is in its fully deployed position, canopy 25 traps air above helmet 33 during ejection of crew member 35. The windblast or air flow as indicated by the arrows in FIG. 1 over the top of canopy 25 creates low pressure so that the higher pressure air between canopy 25 and helmet 33 pushes up canopy 25 with several hundred pounds force. This load is transferred to headrest 20 at the back of canopy 25 and to tubular frame 18 at the front of canopy 25. The legs of tubular frame 18 carry compression loads to the top of headrest 20 while the two cords 34 and 36 carry tension loads to the bottom of headrest 20. The tension loads in cords 34 and 36 maintain them in position at the sides of helmet 33 against the action of drag forces on cords 34 and 36 in a manner clearly shown in FIG. 2.

As a result of the positioning of head protector 10, loss of helmet 33 is prevented during the first hundred milliseconds of windblast exposure by partially stagnating air flow over the top surface of helmet 33. The three point contact described hereinabove supports the helmet and head against extreme lateral movement. This three point contact therefore precludes the generation of twisting movements on helmet 33 or the head of crewman 35. In addition, frame 18 blocks the gap between helmet 33 and headrest 20 during main parachute deployment and seat-man separation thus precluding the passage of either left or right parachute risers into this gap where it could then apply main chute opening shock loads to the head or neck of a crew member 35.

Although this invention has been described with reference to a particular embodiment, it will be understood that this invention is also capable of further and other embodiments within the spirit and scope of the appended claims.

I claim:

1. A windblast head protector for use with an ejection seat of an aircraft comprising:
    a tubular frame, said frame having a canopy thereon and means slidably connected to said frame for supporting said frame on top of a helmet of a crew member positioned within said ejection seat when said head protector is in a fully deployed condition;
    means connected between said frame and said ejection seat for providing support for said frame and for contacting the sides of said helmet when said head protector is in said fully deployed condition; and
    means operably connected to said frame for securely positioning said frame against said ejection seat in said fully deployed condition and for moving said frame from a stowed position within a pilot chute compartment of said ejection seat to said fully deployed condition.

2. A windblast head protector as defined in claim 1 wherein said means for securely positioning said frame against said ejection seat and for moving said frame to said fully deployed position comprises a cable passing through said tubular frame and having the ends of said cable operably connected to a deployment means for exerting a force on said cable such that said frame is propelled from said stowed position within said pilot chute compartment to said fully deployed condition adjacent a headrest of said ejection seat.

3. A windblast head protector as defined in claim 2 wherein said headrest of said ejection seat has a pair of openings therein and said cable passes through said openings prior to being connected to said deployment means.

4. A windblast head protector as defined in claim 3 wherein said means connected between said frame and said ejection seat comprises a pair of cords, each of said cords being affixed at one end thereof to said frame and at the other end thereof to said ejection seat.

5. A windblast head protector as defined in claim 4 wherein said canopy is made of a fabric material.

6. A windblast head protector as defined in claim 5 wherein said canopy includes a pair of cross bands secured between said frame and said headrest of said ejection seat in order to add stability to said frame and said canopy.

7. A windblast head protector as defined in claim 6 further comprising a pair of inserts located adjacent said pair of openings, respectively, for aiding in stabilizing said frame when in said fully deployed condition.

8. A windblast head protector as defined in claim 7 wherein said frame is made of U-shaped configuration.

9. The combination of an aircraft ejection seat having a headrest and a windblast head protector for a crew member of said aircraft comprising:
    a tubular frame, said frame having a canopy thereon and means slidably connected to said frame for supporting said frame on top of a helmet of a crew member positioned within said ejection seat when said head protector is in a fully deployed condition;
    means connected between said frame and said ejection seat for providing support for said frame and for contacting the sides of said helmet when said head protector is in said fully deployed condition; and
    means operably connected to said frame for securely positioning said frame against said headrest of said ejection seat in said fully deployed condition and for moving said frame from a stowed position within a pilot chute compartment of said ejection seat to said fully deployed condition.

* * * * *